UNITED STATES PATENT OFFICE.

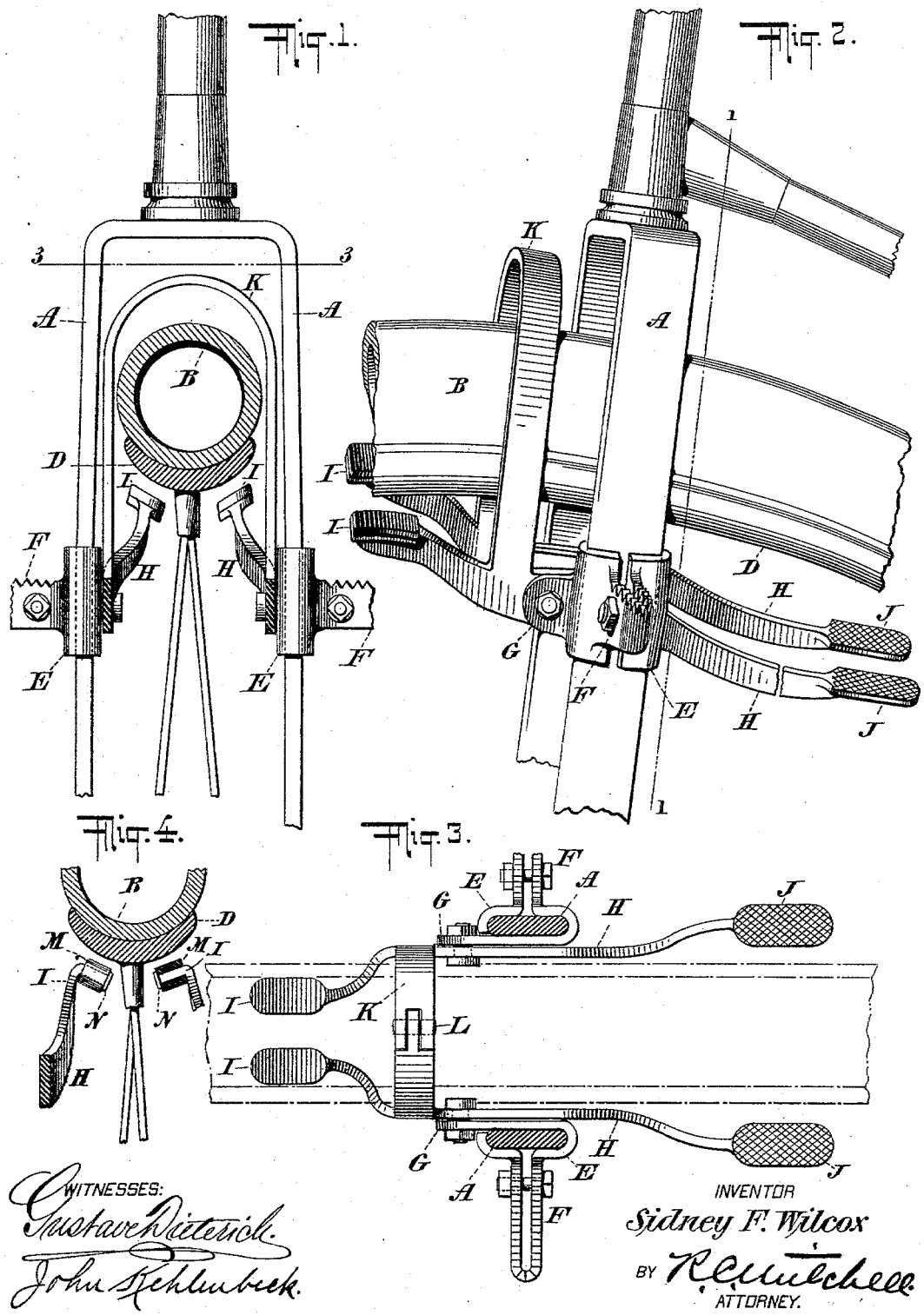

SIDNEY F. WILCOX, OF NEW YORK, N. Y.

BICYCLE-BRAKE.

SPECIFICATION forming part of Letters Patent No. 563,632, dated July 7, 1896.

Application filed December 28, 1895. Serial No. 573,636. (No model.)

*To all whom it may concern:*

Be it known that I, SIDNEY F. WILCOX, a citizen of the United States, residing at New York, in the county and State of New York, have invented new and useful Improvements in Bicycle-Brakes, of which the following is a full, clear, and exact specification.

My invention relates to improvements in brakes for bicycles and other vehicles; and it consists in the novel mechanical construction of the same hereinafter fully described.

The object of my invention is to provide a brake for bicycles and other vehicles, which brake shall be of simple construction and which shall effectively operate to frictionally engage with the rim or felly of the wheel rather than with the outer tire. It has been demonstrated that the use of a brake which engages with the tire proper very often injures the material of which the tire is formed, and frequently to a degree beyond repair. This is particularly true as to pneumatic tires in which the outer layer or shoe (commonly of rubber) is torn away by the frictional contact of the brake from the next lower layer, (usually a fabric,) exposing the same to contact with the road, thus rendering the tire liable to puncture. This objectionable feature is entirely overcome by the use of the construction herein described and claimed, which provides that the brake shoe or shoes shall engage only with the felly or rim portion of the wheel, which is usually constructed of iron or wood and which is therefore better adapted to withstand the frictional contact of the brake-shoes.

My invention is illustrated by the accompanying drawings, in which—

Figure 1 is a front elevation of the upper portion of the front fork of a bicycle, the wheel rim and tire, and my improved brake, a portion of the same being shown in section on line 1 1, Fig. 2. Fig. 2 is a side elevation of the parts illustrated in Fig. 1, the said view being slightly in perspective. Fig. 3 is a section on line 3 3, Fig. 1, illustrating a plan view of my improved brake mechanism.

A A are the front-fork blades. B is the tire. D is the wheel-rim supporting said tire. E E are clamps detachably secured to said fork-blades and being susceptible of higher or lower adjustment thereon. If desirable, these clamps may be provided with suitable outward extensions forming foot-rests F F.

G is a bracket extending from each clamp and to which the brake-levers are pivotally connected.

H H are brake-levers pivotally connected at a point intermediate in their length to the brackets G G. These brake-levers H H are by preference provided one on each side of the wheel. One end of each brake-lever is adapted to carry a brake-shoe I, while the opposite end is by preference provided with a flattened surface J upon which pressure may be applied by the foot of the rider. The ends J J of the brake-levers when depressed cause the opposite ends carrying the shoes I I to rise, so as to contact with the under or inner side of the wheel-rim D. In order that pressure on the extremity J of one of the brake-levers may cause both brake-shoes I I (where two are used) to rise and engage the wheel-rim, I by preference provide the arched connection K, extending over the tire B. This connection may be made at any desired point in the length of said levers and prevents the independent tilting of the same. In operation it will be seen that by this construction both levers H H will move simultaneously and both brake-shoes I I will therefore engage with the wheel-rim on opposite sides of the wheel-spokes at the same time. By this means, which illustrates the preferable form of construction, the pressure on each side of the wheel-rim is substantially equal, thus preventing any tendency to throw the wheel out of true, as might be the case if undue pressure were brought to bear on one side only of the rim.

The preferable construction comprises the clamps E E, adjustably supported by the fork-blades A A, the foot-rests F F, extending therefrom, and the brake-levers H H, connected as described and pivotally supported by the clamps, either directly or through the medium of brackets G G. By this means the rider, when it is desired to utilize the brake, steadies the foot upon the rest F and with the heel operates the brake by pressing on the end J of the brake.

The rider may use both feet in operating the brake if desirable.

Obviously the foot-rests F F may be dispensed with if desirable.

The extremities J J of the brake-levers H H may be either flattened, rounded, or in any other way modified. The brake-levers H H may be pivotally connected either mediately or immediately to the clamps E E.

The arched connection K may be provided with the joint L to permit the spread of the same to vary, so that the device may be fitted to front forks of varying widths.

The device illustrated is normally adapted to stand in the position indicated in Figs. 1 and 2, in which position the brake-shoes are slightly away from the wheel-rim, the same being accomplished by the action of gravity. It is obvious, however, that any well-known form of spring may be applied to the device to cause the same to normally remain in said position.

In the drawings hereto annexed the brake-shoes are adapted to contact with the under side of the wheel-rim at points in front of the fork-blades A A. It is obviously only necessary to reverse the adjustment of the brake device to cause the brake-shoes to engage with the wheel-rim to the rear of said fork-blades, in which event the brake-lever would be operated by the ball of the foot rather than by the heel.

It is apparent that in carrying out my invention it may be desirable to make some changes in the particular construction shown and described, and I would therefore have it understood that I do not limit myself to specific forms of construction, but hold myself at liberty to make such changes as are fairly within the spirit and scope of my invention.

Fig. 4 shows another method of construction by which the ends I I of the brake-levers H H are bent over to form a brake-shoe, so that a rubber band M may be stretched over it and held in place by a flange N. The shoe I may be used without the rubber band M or the flange N, if desired.

Having thus described my invention, what I claim, and desire to secure by Letters Patent, is—

1. A bicycle-brake comprising the brake-levers pivotally connected at points intermediate in their length to clamps adjustably secured on the fork-blades, on each side of the wheel, a rigid arched connection between said brake-levers, and brake-shoes carried by said brake-levers below the wheel-rim, substantially as described.

2. The combination in a bicycle-brake of clamps adjustably mounted on the fork-blades, foot-rests extending from said clamps, with brackets extending from said clamps, brake-levers pivotally connected at points intermediate in their length to said brackets, an arch rigidly connected to said brake-levers, the joint L in said arch permitting the same to spread, brake-shoes carried by said levers underneath the wheel-rim, substantially as described.

SIDNEY F. WILCOX.

Witnesses:
C. B. EATON,
J. S. OSWALD.